United States Patent [19]

Takezoe

[11] 4,320,508
[45] Mar. 16, 1982

[54] SELF-DIAGNOSING, SELF-CORRECTING COMMUNICATIONS NETWORK

[75] Inventor: Fumihiko Takezoe, Kawasaki, Japan
[73] Assignee: Fuji Electric Co., Ltd., Tokyo, Japan
[21] Appl. No.: 137,281
[22] Filed: Apr. 4, 1980
[30] Foreign Application Priority Data
 Apr. 6, 1979 [JP] Japan .................................. 54-41842
[51] Int. Cl.³ ........................ G06F 11/00; H04B 17/00
[52] U.S. Cl. ........................................ 371/22; 370/15; 371/11; 371/25
[58] Field of Search ............... 371/22, 25, 11; 370/14, 370/15, 16

[56] References Cited
U.S. PATENT DOCUMENTS

| | | | |
|---|---|---|---|
| 3,790,769 | 1/1974 | Ziegler | 371/22 |
| 4,042,794 | 8/1977 | Lima et al. | 371/22 |
| 4,075,440 | 2/1978 | Laubengayer | 370/15 |
| 4,112,414 | 9/1978 | Iscol et al. | 371/22 |
| 4,163,210 | 7/1979 | Giraud | 371/22 |
| 4,242,750 | 12/1980 | Finck et al. | 371/22 |

OTHER PUBLICATIONS

Lettieri et al., Local/Utility Fault Determination, IBM Technical Disclosure Bulletin, vol. 21, No. 11, Apr. 1979, pp. 4584-4585.

*Primary Examiner*—Charles E. Atkinson
*Attorney, Agent, or Firm*—Bruce L. Birchard

[57] ABSTRACT

A ring-configured network of multiple inter-communicating data stations in which each data station includes a fault sensing circuit, a test-pulse generating circuit and a switching circuit as well as a transmitter circuit and a receiver circuit, and the test pulse generating circuit responds to a sensed fault to transmit, sequentially, in opposite directions along the ring, test signals which, in combination with the fault sensing circuit, indicate the direction of any fault and terminate the line in the direction of the fault at the characteristic impedance of the line. Thus, normal communications can continue between the stations despite the fault.

10 Claims, 11 Drawing Figures

SELF-DIAGNOSING, SELF-CORRECTING COMMUNICATIONS NETWORK

BACKGROUND OF THE INVENTION

1. Field of the Invention

This invention relates to communications network and particularly to such networks used for data transmission.

2. Prior Art

Data networks or highways are of increasing importance in commerce and industry.

The increasing use of Electronic Funds Transfer Systems in banking is an added element in considering the need for accuracy and reliability in data networks. In the conventional system, if a fault occurs adjacent one station in the network that station is isolated and useless until the line is restored. This problem has been attacked by building redundancy into the system, i.e., by having plural sets of lines. The cost of such systems, particularly with dedicated long-distance lines or micro-wave systems, becomes prohibitive. A simple loop system does not solve the problem because, if a fault occurs, the discontinuity produces false signals by reason of the signal reflections which occur at the unterminated line or improperly terminated line where the fault occurs.

Therefore, it is the general object of this invention to overcome the various disadvantages of the prior art, as set forth hereinbefore.

It is a further object of this invention to provide a communications network which is self-diagnosing and self-correcting if and when a fault occurs in the lines of the network.

SUMMARY OF THE INVENTION

Multiple stations in a network are connected along a ring-configured set of conductors or their micro-wave equivalent. If a fault occurs at any point in the ring it is sensed by a circuit which compares a received pulse or pulse train with a reference gate, pulse or pulse train and if the received pulse or pulse train differs from the reference gate, pulse or pulse train, such circuit generates a fault indication signal for triggering a fault location mode of operaion at each station. In the fault location mode, each station sequentially terminates the line with its characteristic impedance in one direction and transmits a test signal in the other direction. If the circuit is complete in the unterminated direction no reflections occur and no fault is sensed in that direction. The line driver is then switched to drive the line in the opposite direction, the resistance termination being removed in the direction of drive or transmission and a corresponding termination resistance connected in the previously unterminated direction of the line. Once again, if there is no fault there will be no spurious signal reflected and no fault will be sensed in that direction. Under the "no-fault" condition in both directions the transmission lines, or their equivalent, will be switched to a continuous thru-put condition without any artificial termination. On the other hand, if a fault exists in one direction abnormal signals will be reflected and will cause, by reason of comparison with a stored reference, for example, the generation of a fault signal which may be stored as a "one" in a register and which will cause the line to be terminated, automatically, in a resistor of a value equal to the characteristic impedance of the line, until the fault is remedied. Because of the artificial termination at the characteristic impedance and the ring-configured nature of the network accurate and reliable communications between all stations will be possible with the re-constituted network.

BRIEF DESCRIPTION OF THE DRAWINGS

My invention, both as to its nature and operation, may best be understood by the description which follows, taken in conjunction with the drawings herein, in which.

DETAILED DESCRIPTION OF THE PREFERRED EMBODIMENTS

Figure 1:
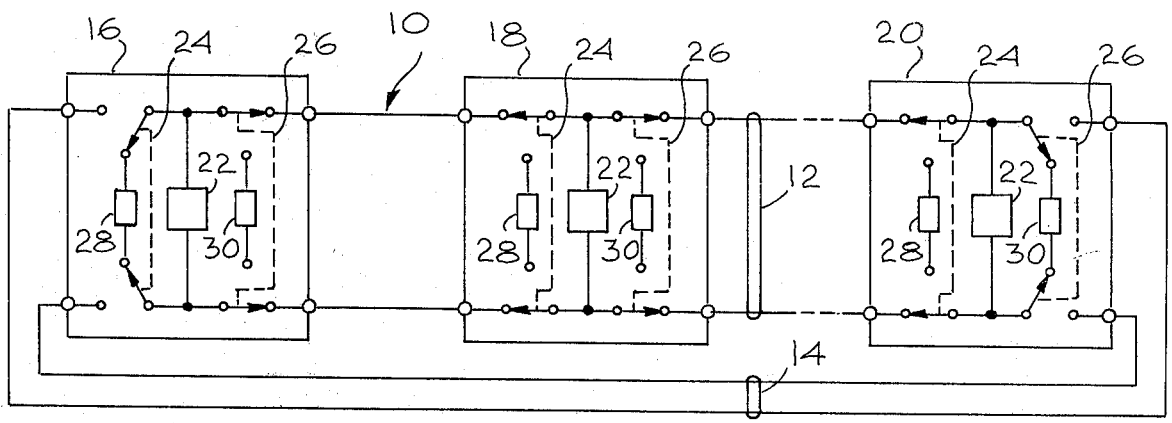
FIG. 1 is a schematic diagram of a ring-configured network according to the present invention, in a first operating mode.

In FIG. 1, communications network 10 has communications line 12 and return communications line 14 across which are coupled multiple, intercommunicating stations 16, 18 and 20. These stations may be considered, for this discussion, as data transmission stations, and lines 12 and 14 as a data highway.

Each station includes a transmitter-receiver 22, a pair of double-pole, double-throw line switches 24, 26 and a pair of terminating resistors each having a value equal to the characteristic impedance of the transmission lines 12, 14. The terminating resistors, 28, 30 are selectively coupled across transmission line 12 by means of switches 24, 26, respectively.

With switches 24, 26 in the positions shown in FIG. 1 lines 12 are terminated at each end in their characteristic impedance and return line 14 is disconnected from the network. In this configuration the network 10 looks much like a conventional data network or highway and the development of a fault in transmission lines 12 (without the automatic re-configuration features of this invention), results in loss of communications between at least one of the stations in the network and the remaining stations.

Figure 2:
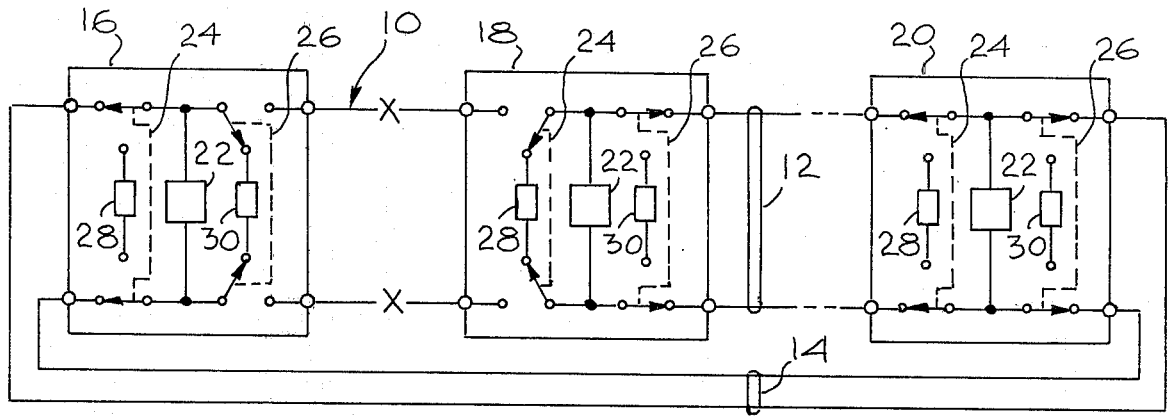
FIG. 2 is a schematic diagram of a ring-configured network of FIG. 1 in a second operating mode.

In FIG. 2, if a fault (X) develops between stations 16 and 18, for example, and switches 24 and 26 assume the positions shown in stations 16, 18 and 20, we find that stations 16 and 18 become terminal stations, being properly terminated by resistors 30 and 28, respectively, and, through return lines 14, they are capable of communicating with each other and with all the other stations in the network as well. Further, there are no spurious signals which normally arise when a fault occurs and signals "see" impedance discontinuities. It is well known that such discontinuities produce reflections or echoes which give spurious information in data transmission and make even voice transmission difficult.

Figure 3:
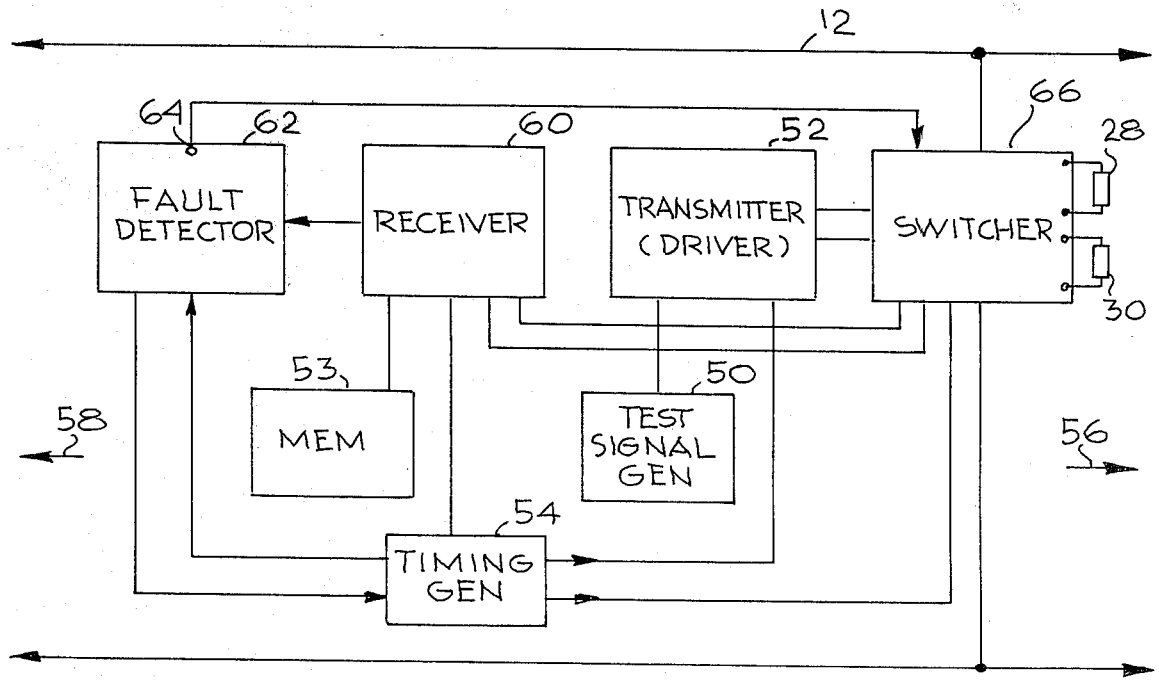
FIG. 3 is a block diagram of a station for use in the networks of FIGS. 1 and 2.

The automatic re-configuration of network 10 when a fault occurs can be achieved by the system of FIG. 3, which is representative of the functions performed at each station.

Any one of several methods can be used to detect the existence of a fault along the communications network. For example, every data transmission from a station is preceded by the transmission of a check signal. The check signal may comprise a set of pulses from signal generator 50, with which each station is provided. Such a check signal is transmitted by transmitter or driver 52 of each station in response to a signal from its timing generator 54 and is received by each other station in its receiver 60. If a fault exists along transmission line 12 in either direction 56 or 58, the check signal will be reflected from the fault and will be garbled by changes in pulse widths, number of pulses and/or time-position of the pulses. Those garbled signals will be received by receiver 60 in each station of the network and will be passed to fault detector 62 which is activated for a predetermined time after a check signal transmission. Fault detector 62 has within it, for example, a pair of registers and a comparator. In one register the proper check signal is stored in binary fashion. If the check signal received by fault detector 62 differs from the stored reference check signal an output signal (indicating a fault anywhere in the transmission lines of the network) is developed at terminal 64 and it commands timing generator 54 and switches 66 to go into a diagnostic or search mode. Memory 53 represents both registers 90 and 92 in FIG. 4. Those registers store fault direction information in the fashion described in connection with the description of FIG. 4, which follows.

The purpose of the diagnostic or search mode is to locate the fault with respect to the two stations adjacent it. The reconfiguration or correction of the network follows directly from the results of the diagnostic mode of operation, as can be understood from a discussion of FIG. 4.

Figure 4:
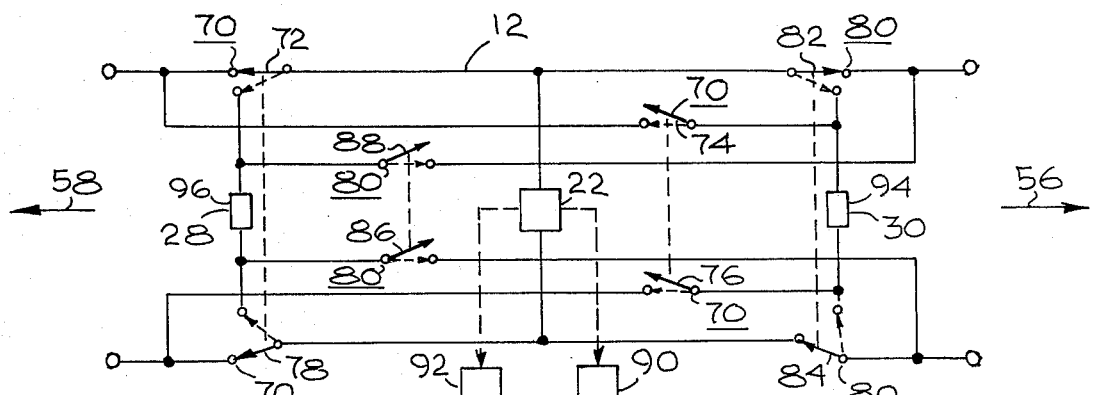
FIG. 4 is a block diagram showing a network station with automatic diagnostic capabilities.

In FIG. 4, line switch 70 may be a 4-pole, double-throw switch having arms 72, 74, 76 and 78 (or the semiconductor equivalents thereof). Switch 80 is a second 4-pole, double-throw transmission line switch having arms 82, 84, 86 and 88, or their semiconductor equivalents. The switch arm position shown in FIG. 4 is for the normal, fault-free condition of transmission line 12. Signals to and from the receiver-driver (or receiver-transmitter) 22 flow freely in both directions 56 and 58 along line 12. When a fault-indicating signal is generated by fault detector 62, switch 70 is activated, switching arms 72, 74, 76 and 78 to the dotted line positions in FIG. 4. Switch 80 remains in its normal state. As a result, transmission line 12 is terminated in direction 58 and a test signal transmitted by receiver-transmitter 22 is sent by each station simultaneously in direction 56. If no fault exists in that direction, no output signal will be derived from fault detector 62 and resistor 90 will remain in a zero state. However, if a fault is sensed the output "1" from fault detector 62 will set register 90 in a "1" state, which will cause switch 70 to return to its original condition. Switch 80 will have its arms 82, 84, 86 and 88 moved to the dotted line position shown in FIG. 4 where they will remain until the transmission of a test signal shows the fault is eliminated. The transmission line 12 is terminated in direction 56 by resistor 94.

If a transmission in direction 56 shows no fault, the switcher 66 will be caused by timing generator 54 to activate switch 80 into the dotted-line position with switch 70 in the normal position. The test signal from each station will then be transmitted in direction 58 and, if no fault exists, register 92 will remain in a "zero" state. If a fault exists, register 92 will be shifted to a "one" state which will cause switcher 66 to move the switch arms 72, 74, 76 and 78 of switch 70 to the dotted-line position, switch 80 being in the normal position. As a result, transmission line 12 is terminated by resistor 96 in direction 58 and is open to the network in direction 56. This station becomes a terminal station for the network.

Figure 5:
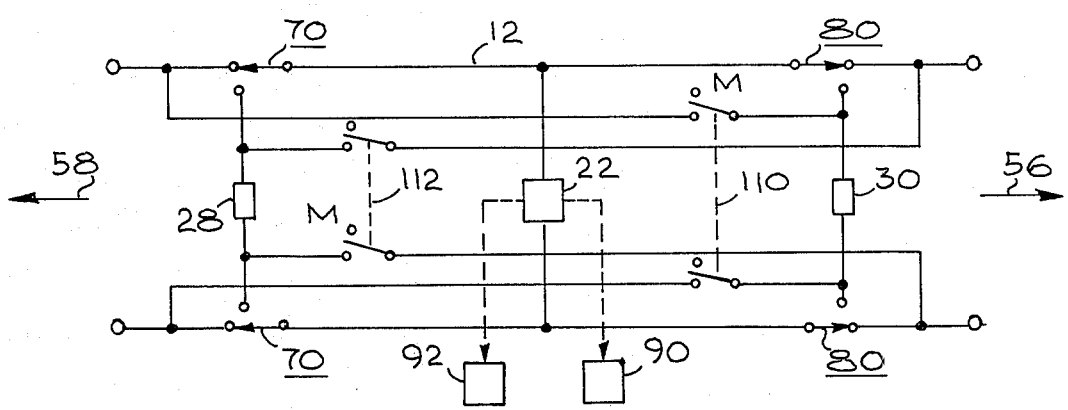
FIG. 5 is a block diagram showing a network station with manual and automatic switching capabilities.

With the totally automatic switching configuration of FIG. 4, some oscillatory conditions may occur on startup of the network. To avoid this problem the switching arrangement of FIG. 5 may be utilized. In FIG. 5, two arms 74 and 76 of switch 70 have been replaced by a two-pole switch 110 which has manual (M) and automatic positions. Two arms 86, 88 of switch 80 have been replaced by a two-pole switch 112 which has manual (M) and automatic positions. In the manual position both switches 110 and 112 are open. Start-up of the network may then be performed without oscillations. After the network has been turned on and time for stabilization has transpired, switches 110 and 112 are moved out of the manual (M) mode into the automatic mode and thereafter function as described hereinbefore.

Figure 6:
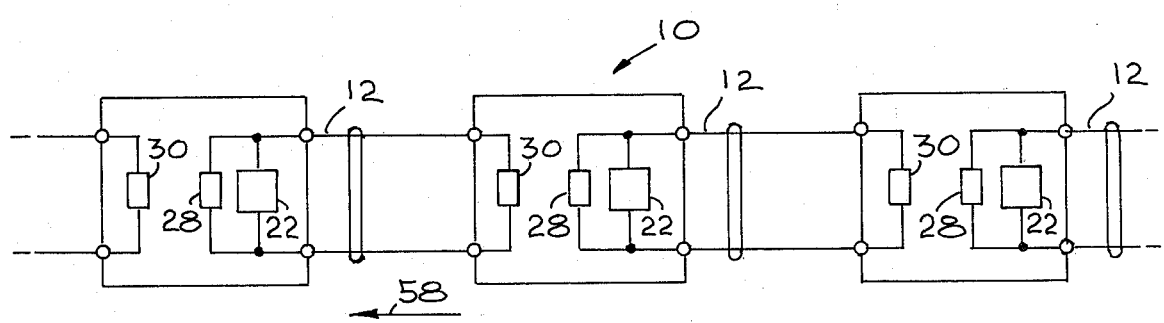
FIG. 6 is a block diagram showing the network configuration for a first diagnostic mode.
Figure 7:
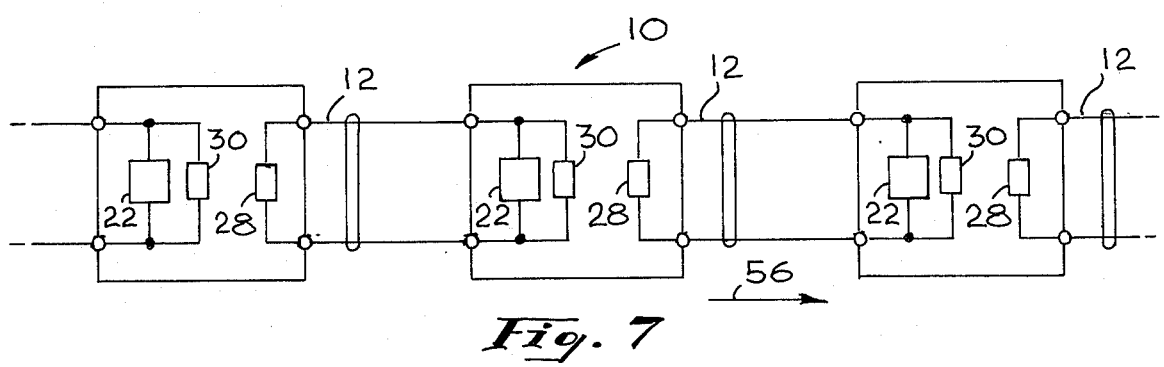
FIG. 7 is a block diagram showing the network configuration in a second diagnostic mode.

The effective configuration of the network during diagnosis or search in the two directions 58 and 56, respectively, is shown in FIGS. 6 and 7, respectively.

Figure 8:
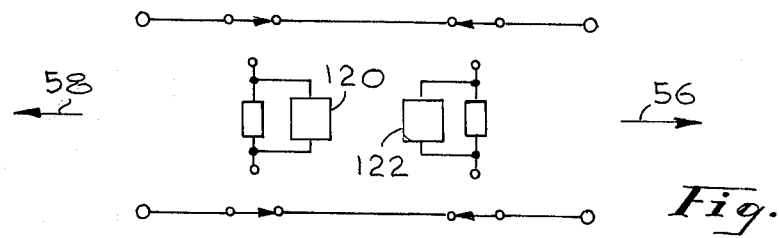
FIG. 8 is a block diagram of an alternative receiver-transmitter configuration for use with the network of FIG. 1.

The single receiver-transmitter member 22 of FIGS. 1 through 7 may be replaced by a pair of transmitter-receiver circuits, as shown in FIG. 8. Here, fault information in direction 58 is obtained by transmitter-receiver 120 fault information in direction 56 is obtained by transmitter-receiver 122.

Figure 9:
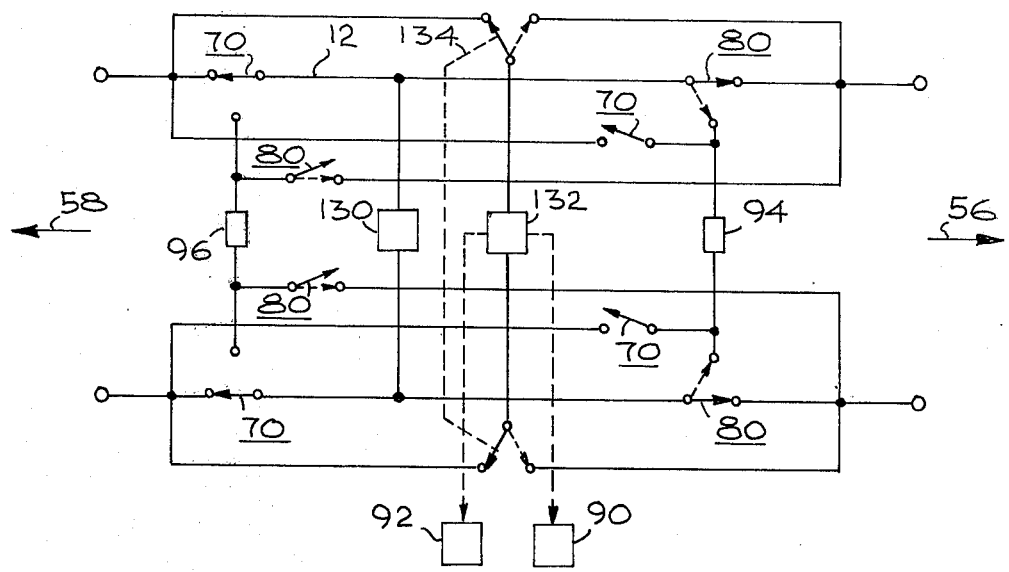
FIG. 9 is a block diagram showing an alternative receiver-transmitter configuration for use with the network of FIG. 1.

If the transmitter (or driver) is separated from the receiver the circuit configuration for automatic diagnosis and re-structuring is shown in FIG. 9. The transmitter or driver 130 is coupled across transmission line 12 by means of four-pole, double-throw switches 70 and 80, as before. Receiver 132 is coupled across transmission line 12 by means of double-pole, double-throw switch 134.

The switches are shown in FIG. 9 in their normal operating state prior to the sensing of any fault in the network. If a fault is sensed, switch 70 will be activated and search or diagnosis in direction 58 will occur. Sequentially, switch 70 will return to its normal position and switches 80 and 134 will move to the dotted line positions, as shown in FIG. 9. Under these conditions, diagnosis of the transmission line 12 in the direction 58 will occur. If no faults are found, all the switches will return to normal. If a fault is found in direction 56, the line will be terminated by resistor (or impedance) 96. Communications will then continue in direction 58 around the network. Conversely, if a fault is found in direction 58, impedance 94 will terminate the line in that direction and communications will occur in direction 58 to all stations in the network.

Figure 10:
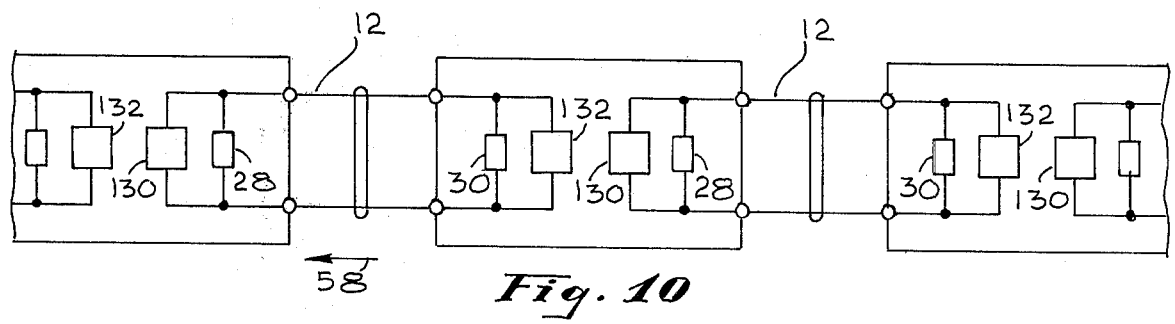
FIG. 10 is a block diagram showing the configuration of a network utilizing the receiver-transmitter of FIG. 9 in a first diagnostic mode; and, FIG. 11 is a block diagram showing the configuration of a network utilizing the receiver-transmitter of FIG. 9 in a second diagnostic mode.
Figure 11:
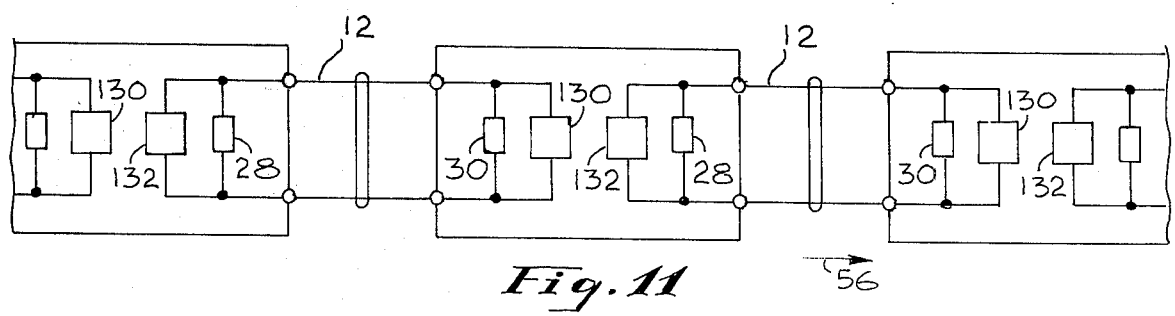

The network configurations corresponding to these two sets of conditions for the station format of FIG. 9 are shown in FIGS. 10 and 11.

Thus, there has been provided by this invention a self-diagnosing, self-correcting or re-configuring communications network.

The switching, storing and comparing circuits referred to in this application are commonly available in both discrete and I-C form and need not be dwelt upon here.

Reference to transmission lines herein is meant to include the micro-wave network equivalent of hard transmission lines.

While a particular embodiment has been shown and described it would be apparent to one skilled in the art that variations and modifications may be made without departing from the scope of my invention. It is the purpose of the attached claims to cover all such variations and modifications.

What is claimed is:

1. A self-diagnosing, self-reconfiguring communication network, which includes:

a transmission line;

a plurality of inter-communicating stations each adapted for coupling to said transmission line, each such station including transmitting means for transmitting information signals, receiving means for receiving said information signals, fault detecting means, terminating means, switching means, and timing means for controlling said transmitting and receiving means;

said transmitting means including a check signal generator responsive to signals from said timing means for generating check signals which are transmitted by said transmitting means in connection with the transmission of said information signals;

said fault detecting means being coupled to said receiving means in each station and being responsive to a garbled, received check signal to produce a fault signal;

said switching means being coupled to said transmission line, to said transmitting means, to said receiving means, to said fault detecting means and to said terminating means and being responsive to a fault signal from said fault detecting means to terminate said transmission line, sequentially in a first direction for a first period and in a second direction for a second period;

said transmitting means including test signal generating means and being responsive to a fault signal from said fault detecting means for transmitting a test signal in said first direction during said first period and in said second direction during said second period to produce first and second response signals, respectively, at said receiving means;

said fault detecting means being coupled to said receiving means and being responsive to a difference between said test signal and said response signals received from said transmission line in response to said test signal transmitted in said first and second periods, respectively, to produce a switching signal;

2. Apparatus according to claim 1 in which said check signals are transmitted prior to the transmission of said information signals.

3. Apparatus according to claim 1 in which said receiver includes memory registers for storing fault direction information.

4. Apparatus according to claim 1 in which said switching means includes manual switching means for operating during a stabilization of said network.

5. Apparatus according to claim 1 in which said transmitting means and said receiving means are separately coupled to said transmission line through said switching means.

6. Apparatus according to claim 1 in which said fault detecting means includes test signal storing means, a response signal register and signal comparing means for comparing the signal stored in said register with said response signal.

7. Apparatus according to claim 6 which includes, in addition, means for generating a fault signal at the output from said fault detecting means when said stored test signal and said response signal differ.

8. Apparatus according to claim 1 in which said transmitting means and said receiving means are plural in number in each station.

9. Apparatus according to claim 1 in which, in the absence of a fault, said transmission line forms a closed ring.

10. Apparatus according to claim 1 in which said transmitting means transmits binary-coded data.

* * * * *